United States Patent [19]

Gaffigan

[11] Patent Number: 5,584,950
[45] Date of Patent: Dec. 17, 1996

[54] SOUND INSULATING MEMBRANE

[75] Inventor: Walter J. Gaffigan, Baton Rouge, La.

[73] Assignee: The Noble Company, Grand Haven, Mich.

[21] Appl. No.: 467,086

[22] Filed: Jun. 6, 1995

Related U.S. Application Data

[62] Division of Ser. No. 151,352, Nov. 12, 1993.

[51] Int. Cl.$^6$ .............................. E04B 1/82; E04B 1/84; E04F 13/18
[52] U.S. Cl. ........................... 156/71; 181/286; 181/291; 181/294; 428/289
[58] Field of Search ......................... 156/71, 60, 244.27; 428/284, 286, 287, 476.9, 289; 181/210, 284, 286, 287, 290, 291, 294; 52/144

[56] References Cited

U.S. PATENT DOCUMENTS

| 4,110,510 | 8/1978 | Oliveira . | |
|---|---|---|---|
| 4,112,175 | 9/1978 | Kikuchi et al. . | |
| 4,429,068 | 1/1984 | Nakahira . | |
| 4,567,704 | 2/1986 | Bernett et al. | 52/309.3 |
| 4,681,786 | 7/1987 | Brown | 428/44 |
| 4,997,880 | 3/1991 | VanDer Groep . | |
| 5,403,892 | 4/1995 | Puydak et al. | 525/192 |

FOREIGN PATENT DOCUMENTS

| 0421849A1 | 4/1991 | European Pat. Off. . |
|---|---|---|
| 0567366A1 | 10/1993 | European Pat. Off. . |
| 2693221A1 | 1/1994 | France . |
| 1562783 | 3/1980 | United Kingdom . |

OTHER PUBLICATIONS

Akzo Industrial Systems Company, *Enkasonic* Product Brochure, 13081/AKZ Buyline, 1778, ES–8L, Sep., 1989, pp.: 1–4.

The Dow Chemical Company, *Designing Sound–Rated Ceramic Tile Floors with Ethafoam 222 Brand Polyethylene Foam Sheet*, 1983, Form No. 172–9628–83, pp.: 1–8.
Kinetics Noise Control, Inc., Kinetics™ Type SR Sound Rated Floor Systems Product Brochure, SR–291, pp.: 1–2.
Kinetics Noise Control, Inc., *General Installation Procedure for Type SR Floorboard*, Mar. 15, 1989, 1 page.
Kinetics Noise Control, Inc., *Description and Requirements for SR Floorboard Installation*, Mar. 15, 1989, pp.: 1–3.
National Voluntary Laboratory Accreditation Program for Selected Test Methods for Acoustics (NVLAP), *Riverbank Acoustical Laboratories of IIT Research Institute Report*, for CTI Case #16B Floor/Ceiling Assembly With Hanging Ceiling, Test No. RAL–IN86–25, Oct. 22, 1986, pp.: 1–6.
National Voluntary Laboratory Accreditation Program for Selected Test Methods for Acoustics (NVLAP), *Riverbank Acoustical Laboratories of IIT Research Institute Report*, for CTI Case #16B Floor/Ceiling Assembly With Hanging Ceiling, Test No. RAL–TL86–279, Oct. 22, 1986, pp.: 1–6.
ChemRex, Inc., PCI–USA, *PCI Polysilent® Impact Sound Insulation System* Product Brochure, May 1990 (Released Jan., 1990), Form No. PCI–128, 1 page.

*Primary Examiner*—Daniel Stemmer
*Attorney, Agent, or Firm*—Price, Heneveld, Cooper, DeWitt and Litton

[57] ABSTRACT

A sound insulating membrane and processes for forming, particularly well suited for use in floor, ceiling and wall constructions. The membrane comprises at least one backing layer in contact with a layer of polymeric material. The polymeric material has an elongation factor of about 500% to about 900% and a Shore A hardness of from about 65 to about 80 points, 5 seconds. In a preferred embodiment, the polymeric material comprises 40–70% chlorinated polyethylene, 20–30% ethylene vinyl acetate, and up to 10% polyvinyl chloride. Floor, ceiling, and wall constructions and related methods utilizing the sound insulating membranes are also disclosed.

12 Claims, 2 Drawing Sheets

SOUND INSULATING MEMBRANE

This application is a division of application Ser. No. 151,352, filed Nov. 12, 1993.

FIELD OF INVENTION

File present invention relates to a sound insulating membrane for use in residential, business, and industrial buildings. The present invention is particularly well suited for use in ceiling, floor and wall constructions employing ceramic or masonry materials.

BACKGROUND OF THE INVENTION

Ceramic and masonry tile floor and wall coverings have been used extensively in the construction of buildings for many years. Such materials are employed for their strength, durability, attractive appearance and excellent thermal insulating properties. Despite their many desirable features, ceramic and masonry materials typically exhibit poor sound and acoustic insulating properties.

It is undesirable to utilize materials having poor sound or acoustic insulating properties in buildings, especially in modern multi-story urban buildings having high population densities, such as apartment or office buildings. Nearly all apartment dwellers, hotel guests and office workers have at one time or another been subjected to irritating, bothersome noise from an adjacent room or an upper or lower level. In addition, certain high security meeting rooms may even require that sound not be transmitted beyond the confines of the room.

Moreover, it is desirable to have a high degree of sound insulation in the walls and panels of mobile homes, campers, motor homes and other recreational vehicles. It is also beneficial for mass transit vehicles such as subways, trains and buses to have relatively quiet interiors for passenger comfort. Moreover, it is desirable to provide quiet environments in cabins of airplanes and marine vessels.

Ceiling, floor and wall assemblies are typically subjected to two types of noise—airborne sound, for example speech or music, and impact noise, for instance from footsteps. Many building codes have been amended and ordinances enacted in response to the demand for reduced noise levels in buildings, to specifically require that ceiling, floor and wall constructions exhibit certain minimum sound and acoustic insulating characteristics. Codes are currently in effect in Los Angeles, Sacramento, Seattle, and Minneapolis. Such codes typically require that ceiling, floor and wall constructions achieve a Sound Transmission Class (STC) rating of at least 50 (or 45 if field tested), as determined by ASTM Standards E90, E336 and E413. This rating provides a measure of the amount of airborne sound transmitted between rooms or floors. In addition, such constructions are also typically required to achieve an Impact Insulation Class (IIC) rating of at least 50 (or 45 if field tested) as determined by ASTM E90, E336 and E492. This rating provides a measure of the amount of impact noise transmitted between rooms or floors.

There are currently a variety of sound insulating materials presently available which are advertised as achieving a STC and IIC of at least 50. These insulators typically utilize materials having numerous air-filled cells, such as foams, a honeycomb construction, one or more fibrous layers, or a combination of these constructions. An example of a sound insulating material employing a fibrous layer is ENKASONIC® available from Akzo Industrial Systems Company of Asheville, N.C. ENKASONIC® utilizes a composite matt of nylon filaments which is bonded to a nonwoven fabric. An example of a sound insulating material utilizing a foam layer containing numerous air-filled cells is ETHAFOAM® from Dow Chemical of Midland, Mich. There are also materials available which employ both a fibrous matt and air-filled compartments or cells. KINETICS® Type SR Floorboard available from Kinetics Noise Control, Inc. of Dublin, Ohio employs a rigid phenolic treated honeycomb core layer which is molded between two layers of high density glass fibers. In addition, PCI-POLYSILENT® available from ChemRex, Inc. of Minneapolis, Minn., consists of a layer of latex foam bonded to a polyester matting.

However, all currently available sound insulating materials suffer from a variety of drawbacks. The first of such drawbacks is the relatively high thickness of these materials. The thicker the material, the greater the thickness of each ceiling, floor and wall construction utilizing the sound insulating material and therefore greater the reduction in volume of each room. Moreover, the effect of additional thickness creates an additional concern during the design of multi-story high rise buildings. Furthermore, the use of relatively thick and often rigid sound insulating materials during construction is cumbersome and typically increases the amount of labor required in constructing the ceiling, floor and walls. Such relatively thick and often rigid materials necessitate additional cutting and fitting operations that an otherwise thin and flexible material would not require.

Thus, there is a need for a sound insulating material which meets the STC and IIC ratings imposed by many codes and ordinances and yet which is in the form of a relatively thin and flexible layer. The previously noted materials, KINETICS®, ENKASONIC®, ETHAFOAM® and PCI POLYSILENT® have thicknesses of 0.625", 0.4", 0.25" and 0.157", respectively. It would be desirable to have a relatively thin and flexible, effective sound insulating material, which achieved both a STC and an IIC of at least 50, or 45 , if field tested, and having a thickness less than about 0.150".

Another drawback with many, if not all presently available sound insulating materials, is that such materials typically utilize volatile softeners or plasticizers, generally in significant amounts. The volatile softeners or plasticizers are generally released from their host material over time into the surrounding environment. This is particularly undesirable in buildings having limited traffic or infrequently used or poor ventilation, in view of the potential health hazards and disagreeable nature of such compounds. Moreover, for those sound insulating materials which utilize softeners or plasticizers to achieve a pliable, vibration absorbing material, the loss of plasticizer will result in a reduction in the sound insulating ability of the material. Thus, there is a need for an effective sound insulating material which does not require a volatile softener or plasticizer in significant amounts, and therefore will maintain its sound insulating properties over an extended period of time.

SUMMARY OF THE INVENTION

The present invention provides a sound insulating membrane having a thickness less than about 0.150" comprising at least one backing layer and a polymeric layer contacting at least one backing layer. The polymeric layer comprises a material which has an elongation factor of about 500% to about 900% and a Shore A hardness of from about 65 to about 80 points, 5 seconds. In a preferred embodiment the polymeric material comprises from about 40% about 70% chlorinated polyethylene, from about 20% to about 30% ethylene vinyl acetate and up to about 10% polyvinyl chloride. In addition, the present invention provides ceiling, floor and wall constructions having improved sound insulation properties by incorporation of the membranes of the present invention.

DESCRIPTION OF THE PREFERRED EMBODIMENT

Figure 1:
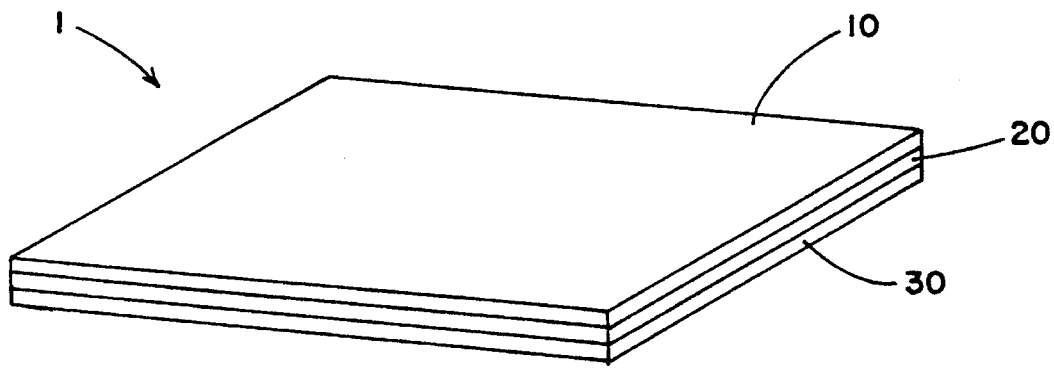
FIG. 1 is a perspective view of a first embodiment of the membrane of the present invention in which a polymeric matrix layer is disposed between a first and a second backing layer.

As illustrated in FIG. 1, a first embodiment of the sound insulating membrane 1 of the present invention comprises a first backing layer 10, a polymeric matrix layer 20, and a second backing layer 30. Polymeric matrix layer 20, disposed between backing layers 10 and 30, is affixed to the layers so that the resulting laminate structure may be formed as a single sheet and will not subsequently separate into its respective component layers. Thus, during storage, application or use, membrane 1 may be handled as a unitary sheet or material.

Although not wishing to be bound to any particular theory, it is believed that the sound insulating properties of the relatively thin membrane of the present invention result from the membrane's unique sound dissipation mechanism. Upon reaching the membrane, a vibratory disturbance, e.g. airborne sound or impact noise, is first transmitted to one or more backing layers of the membrane, which then transfer the disturbance across the membrane surface, generally over a broader area than that which the disturbance initially contacted. After having spread across at least a portion of the membrane surface, the vibratory disturbance is transmitted to the polymeric matrix underlying or adjacent to the backing layer. The polymeric matrix absorbs the remaining energy, or at least a substantial portion, of the vibratory disturbance, thereby achieving the desired sound and acoustic insulating function.

The ability of the polymeric matrix to absorb energy from a vibratory disturbance is further believed to result from the polymeric matrix being relatively flexible and elastic. By "relatively flexible and elastic" it is meant that the polymeric matrix has a relatively loose and amorphous structure to allow the material to absorb vibratory energy at a microscopic level. That is, instead of relying upon large macroscopic fibers or air-filled compartments or cells as much of the currently available sound insulating materials do (e.g. fiberglass or nylon fibers of fibrous matts or honeycomb and foam constructions), the polymeric matrix of the present invention utilizes the molecular chains of the polymeric matrix to primarily absorb the vibratory energy.

Although the particular characteristics and structure of the polymeric matrix at the molecular level are not fully understood, certain measurable macroscopic physical characteristics have been found necessary in order to achieve the sound insulating characteristic of the present invention. Specifically, it has been found that the polymeric matrix, before incorporation into the membranes of the present invention, should exhibit an elongation factor as measured by ASTM D412 or ASTM D638, of from about 500% to about 900%. It is preferred that the polymeric matrix, before incorporation into the membranes of the present invention, exhibit an elongation factor of from about 600% to about 800%. In addition, it has been found that the polymeric matrix should be relatively soft, so that the material has a Shore A hardness of from about 65 to about 80 points, 5 seconds, as measured according to ASTM D2240. It is preferred that the polymeric matrix have a Shore A hardness less than about 75±2 points, 5 seconds.

Polymeric matrix 20 is comprised of one or more polymeric materials so that the resulting polymeric matrix 20 has the particular physical characteristics as previously described. It is preferred that polymeric matrix 20 comprise a combination of from about 40% (all percentages expressed herein except where noted are weight percentages based on the total weight of the resulting polymeric matrix) to about 70% of chlorinated polyethylene, from about 20% to about 30% of ethylene vinyl acetate, and from about 0% to about 10% of polyvinyl chloride. It is preferred that the chlorinated polyethylene component have a chlorine content of from about 36% to about 50%, based upon the weight of the chlorinated polyethylene. The chlorinated polyethylene is preferably a linear polyethylene having a density of not less than about 0.95 g/cm, a heat of fusion less than about 0.4 cal/g, and having a melt viscosity of about 1700±500 Pa.s (Pascal-second) when measured at 190°±2° C. melt and shear rate of 150±10 seconds. A suitable chlorinated polyethylene is available from Dow Chemical of Midland, Mich. The ethylene vinyl acetate copolymers preferably comprise from about 5 to about 50% by weight of vinyl acetate incorporated into an ethylene chain. It is optional to utilize the polyvinyl chloride component for polymeric matrix 20. A typical formulation of a commercially available polyvinyl chloride resin suitable for use in the present invention comprises 100 parts of polyvinyl chloride resin, 5 parts of barium stabilizer, 6 parts of epoxy tall oil, 28 parts of di-octyl adipate, 15 parts of calcium carbonate, 2 parts of antimony oxide and 0.25 parts of stearic acid.

It is envisaged that suitable stabilizers, antioxidants, and other additives may be utilized in polymeric matrix 20 depending upon the particular application. An assortment of stabilizer ingredients may be employed in varying amounts in polymeric matrix 20, such as barium stabilizer (preferably about 0.1% to about 5% by weight of polymeric matrix 20), phosphite chelator (preferably about 0.1% to about 1%), epoxidized oil (preferably about 0.1% to about 5%) and stearic acid (preferably about 0.1% to about 1%). It is also envisaged that a lubricant may be utilized such as low density polyethylene in an amount of about 0.1% to about 5%. Additional amounts of polyethylene (non-chlorinated) may also be added. Various end-use additives may also be incorporated such as carbon black, antimony oxide and magnesium silicate to impart particular properties to the polymeric matrix.

It is important in regards to the present invention that there be less than about 2% volatile plasticizers or softeners added to the polymeric matrix. As previously noted, the use of such plasticizers or softeners, is one of several drawbacks of currently available sound insulation materials. Such plasticizers or softeners when incorporated in such materials tend to migrate from the host material into the environment which may create health hazards. Additionally, the migration of such additives from the host material may leave that material in an undesirable rigid, brittle state, and less able to deaden sounds and impacts.

Polymeric matrix layer 20 may also be formed from a variety of other polymeric materials than those previously described herein, so long as the resulting polymeric matrix has an elongation factor of from about 500% to about 900% and a Shore A hardness of from about 65 to about 80 points, 5 seconds. Other suitable polymers include for example, polyethylene hydroxy polymers, polyethylene butene, polyethylene (of low, medium or high molecular weights), polypropylene, isotactic synthetic rubber, nearly any thermoplastic rubber, or blends of one or more of the foregoing.

The thickness of the polymeric matrix 20 for use in the sound insulating membrane 1 of the present invention has a thickness of from about 0.020" to about 0.066". This range of thicknesses enables the membranes of the present invention to be relatively thin, that is less than about 0.150". The minimum thickness of the membranes of the present invention is about 0.020". The preferred thickness is from about 0.030" to about 0.070".

Referring to FIG. 1, backing layers 10 and 30 of membrane 1 may be formed from nearly any woven or nonwoven fabric of resinous fibers including, but not limited to polyester, polypropylene and polyamide. The preferred materials for forming backing layers 10 and 30 are fibers of polyester and polypropylene. It is also envisaged that fibers formed from nylon or glass may be utilized, depending upon the particular application and end-use requirements. That is, the material selected for backing layers 10 and 30 must be compatible with surrounding materials in the environment that membrane 1 will be utilized. For instance, it is not advisable to employ a nylon fabric in a cementitious environment due to nylon's known instability in that environment. It is preferred that backing layers 10 and 30 each have a thickness of about 0.004" to about 0.020". It is most preferred that layers 10 and 30 each have a thickness of about 0.009".

Figure 2:
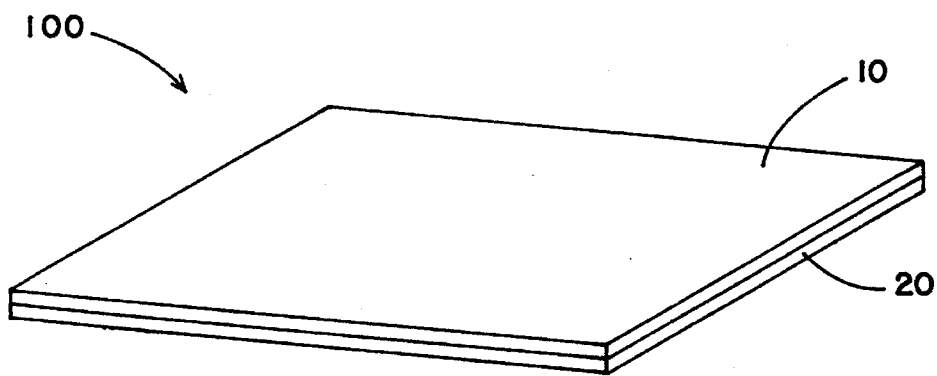
FIG. 2 is a perspective view of a second embodiment of the membrane of the present invention in which a polymeric matrix layer is disposed upon a single backing layer.

FIG. 2 illustrates a second embodiment of the present invention in which a sound insulating membrane 100 is formed with a single backing layer 10. This second embodiment is desirable in applications where the thickness of the ceiling, floor or wall construction is of particular concern, so that materials forming such assemblies should be as thin as possible.

Figure 3:
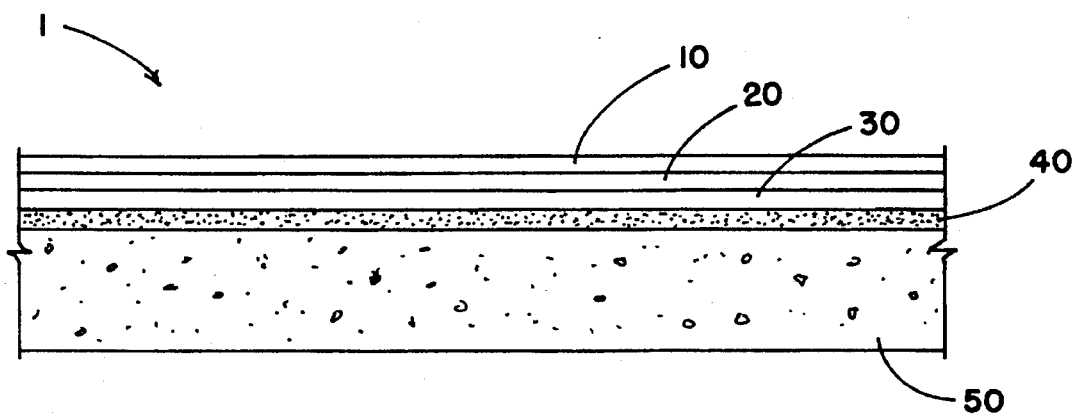
FIG. 3 is a cross-sectional view of the membrane of FIG. 1 applied onto a substrate.

FIG. 3 illustrates a cross-sectional view of the sound insulating membrane 1 of the present invention, affixed to a concrete substrate 50 by use of a layer of binder material 40. Binder material 40 may be any suitable adhesive or binder used for bonding a material to a ceramic or masonry substrate. It is preferred that the sound and acoustical isolation membranes 1 and 100 of the present invention be adhered directly to substrate 50. However, it is envisaged that one or more other layers could be disposed between membranes 1 or 100 and substrate 50 such as a subfloor, a moisture barrier and/or thermal insulation.

Figure 4:
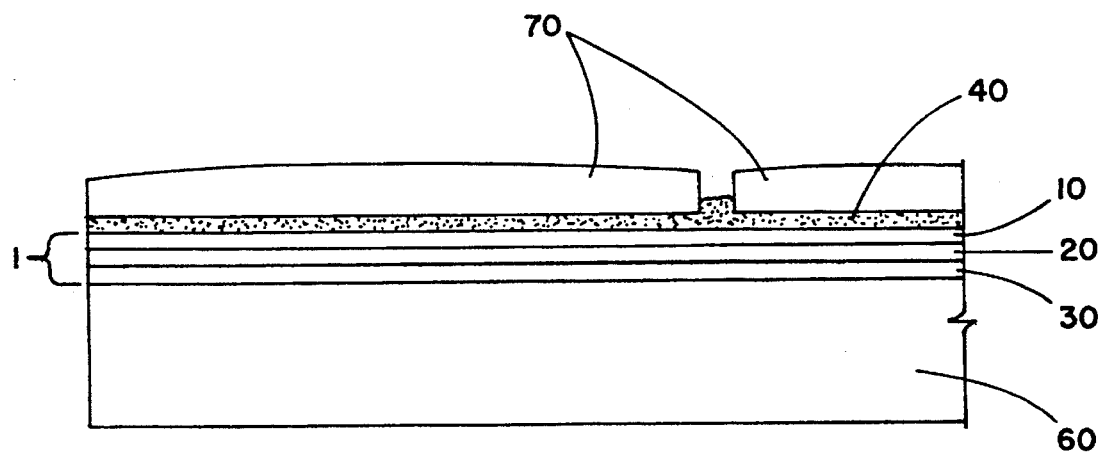
FIG. 4 is a cross-sectional view of the membrane of FIG. 1 disposed between a substrate and a plurality of tiles.

FIG. 4 illustrates a cross-sectional view of an assembly of a plurality of tiles 70, sound insulating membrane 1, and a substrate 60. Substrate 60 may be formed from a variety of materials as are common in the building industry, e.g. wood, concrete, cement, masonry materials, metal, and composites thereof. Such assembly is typical of many ceiling, floor and wall constructions, excluding of course other materials such as wallboard, a moisture barrier, or thermal insulation. The assembly of FIG. 4 further illustrates a bonding material 40, similar to that depicted in FIG. 3, for attaching the tile 70 to an underlying surface. Tile 70 may be any ceramic, masonry or stone tile as is commonly used in the construction of buildings.

Figure 5:
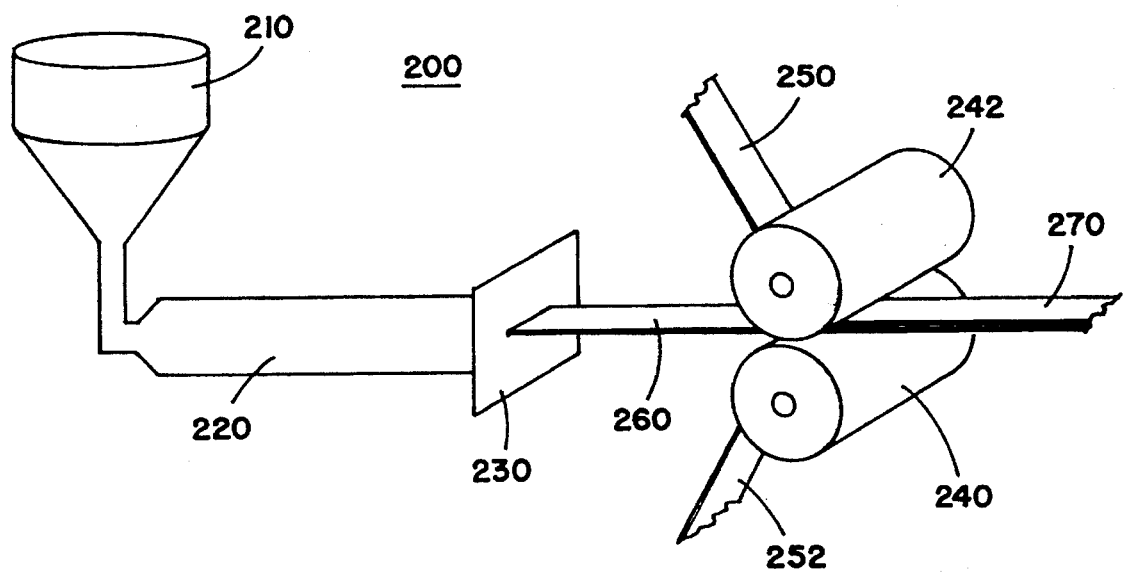
FIG. 5 illustrates a process for forming the membranes of the present invention.

The sound and acoustical isolation membrane of the present invention is formed by a thermoplastic extrusion process, as illustrated in FIG. 5. The basic components for the process 200 illustrated in FIG. 5 are an extruder 220, die 230 and rolls 240, 242. The desired materials for forming the polymeric matrix are added, generally in dry powder or pellet form, to hopper 210. The materials are then directed to the inlet of extruder 220, where they are heated and blended until a homogenous mixture is obtained. Preferably, extruder 220 is a screw extruder. As the heated, blended, polymeric material exits extruder 220 it is forced through die 230. Die 230 preferably has a slit orifice (e.g. often referred to as a "coat hanger" die within the industry) to form the extruded material 260 into a general layer configuration of thickness which is slightly greater than the thickness of the polymeric matrix layer in the final membrane product 270 (or sound insulating membrane 1). The temperature of the extruded polymeric layer 260 should be at least about 200° F. and preferably about 300° F. during passage through die 230. The extruded polymeric layer 260 is then delivered to pinch rolls 240 and 242. These are preferably high precision, chilled opposing rollers which, depending upon the clearance set between them, form the final membrane product 270. As the heated, extruded layer 260 is passed between pinch rolls 240 and 242, it is contacted with backing layers 250 and 252. The pinch rolls compress the laminate assembly together at a pressure of at least about 500 psi, and preferably from about 600 psi to about 1000 psi. Such pressure is necessary so that backing layers 250 and 252 become embedded, at least to a limited degree, within the polymeric layer 260, and also to ensure that layers 250, 252 and 260 will bond and not subsequently separate from one another.

It is preferred that process parameters such as the viscosity of the heated polymeric blend exiting the extruder, temperature of the blend, pressure between pinch rolls 240 and 242 and rate of travel through the rolls be adjusted so that backing layers 250 and 252 be embedded into the layer of polymeric material 260 after compression by pinch rolls 240 and 242 to a depth of about one-half of the thickness of each backing layer. Thus, in the case of a backing layer having a thickness of about 0.009", after compression by pinch rolls 240 and 242 the backing layer should be embedded into the layer of polymeric material to a depth of about 0.004". Moreover, this practice allows the non-embedded portion of the backing layer thickness to be available for bonding to another surface (e.g. a substrate) via an adhesive or bonding material 40, which may impregnate the non-embedded portion of the backing layer. After formation, the final membrane product 270 is then cooled to room temperature and stored.

In addition to being utilized in residential, business and industrial buildings, it is envisaged that the sound and acoustical isolation membrane of the present invention has wide applicability in other areas. For instance, the membrane would be particularly desirable for use in the construction of mobile homes, campers, motor homes and other recreational vehicles where there is a constraint on exterior size yet it is desirable to have maximum interior capacity while retaining an effective degree of sound insulation in the walls. Furthermore, the present invention is expected to find wide application in transit vehicles such as subways, trains and buses. Moreover, wide applicability is envisaged for use in airplanes and in marine vessels.

The following Field Impact Isolation Tests were carried out to determine the F-IIC values for the membranes for the present invention. As will be recalled, most codes and ordinances require F-IIC values of at least 45. The following tests SB2, NB2, LR2 and LR4 were performed in the Channel Gateway Apartments in Los Angeles, Calif. The test and analysis procedures utilized conformed explicitly with ASTM E492-86, "Laboratory Measurement of Impact Sound Transmission Loss Through Floor-Ceiling Assemblies Using the Tapping Machine", and ASTM E1007-84, "Standard Test Method for Measurement of Impact Sound Transmission Through Floor-Ceiling Assemblies and Associated Support Structures" with amendments as required by C.A.C. Title 24, Noise Insulation Standards.

The test equipment employed for each of the following tests SB2, NB2, LR2 and LR4 consisted of a Larson Davis Labs 800B Precision Sound Level Analyzer (S/N 046B0551), and a Larson Davis Labs 2559 ½" Microphone Preamplifier/Capsule (S/N 2559-1248/826B0385). Space average sound pressure level measurements were taken in the receiving room. In the source room, a standard tapping machine was used to generate a vibratory signal which exceeded the ambient noise level by 10 dB or more in all ⅓ octave bands under test. The standard tapping machine utilized for the test was a Norwegian Electronics Type 211R, Model 011 (S/N 11616) which meets the ISO 140/6 standard for tapping machines. Reverberation time measurements were performed using the above noted Larson Davis 3100 system. Reverberation time was sampled a minimum of 3 times in each of the ⅓ octave bands under test and the results averaged. Room temperature was approximately 70° F. at the time of testing. During testing all doors in the rooms being tested were closed.

Test No. SB2

The tested floor/ceiling assembly which separated the source room (unit 440 of the third floor, south bathroom) and receiving room (second floor, unit 340, south bathroom/bedroom area) consisted of 1 ½" lightweight concrete on ⅝" plywood sheathing supported by 2"×10" wood joists 16" C. Attached to the underside of the 2"×10" wood joists, was a series of resilient channels for attaching a layer of ⅝" gypsum board. Immediately below this assembly was a set of 2"×4" joists, also 16" C. having a layer of ⅝" gypsum board attached to their underside. The distance between the gypsum board supported by the 2"×4" joists and the gypsum board attached to the underside of the 2"×10" joists via resilient channels was 14".

The floor covering for Test SB2 was as follows. A 4'×4" area of a layer of W. W. Henry Bond Coat was applied onto the exposed, upward facing surface of the 1½" lightweight concrete. Applied onto the layer of bond coat was a 4"×4" sample of 0.040" thick Noble CH240 TS Sound Insulating Membrane. Next, a layer of an adhesive was applied to the membrane and a layer of ⅜" thick wood flooring laid down.

The Noble CH240 TS Sound Insulating Membrane consisted of a 0.035" thick polymeric layer formed between two layers of 0.007" thick Reemay® fabric partially embedded or pressed into the polymeric layer so that the total thickness of the CH240 TS membrane was 0.040". The composition of the polymeric layer of the CH240 TS membrane was as follows:

| Components | Parts By Weight | Weight Percentage |
|---|---|---|
| Chlorinated Polyethylene (Dow 4811) | 100.0 | 67.34 |
| Witco Barium Stabilizer (Mark 6001) | 3.0 | 2.02 |
| Phosphite Chelator | 1.0 | 0.67 |
| Epoxidized Oil | 5.0 | 3.36 |
| Stearic Acid | 0.5 | 0.34 |
| Polyethylene | 0.5 | 0.34 |
| Linear Low Density Polyethylene | 1.5 | 1.01 |
| Magnesium Silicate | 7.0 | 4.71 |
| Ethylene Vinyl Acetate | 25.0 | 16.83 |
| PVC Compound (North America LT573) | 5.0 | 3.36 |
| | | 100 |

As illustrated in Table I, the F-IIC value stemming from the sound pressure levels reported was 48.

Test No. NB2

The floor/ceiling assembly which separated the source room (third floor, unit 440, north bathroom) and receiving room (second floor, unit 340, north bathroom/bedroom area), was the same as in Test No. SB2. The floor sample utilized in this test was as follows. A 4'×4' test sample was formed by depositing a layer of W. W. Henry Bond Coat onto the upper surface of the 1½" lightweight concrete. Next, a 4'×4' sample of 0.040" thick Noble CH240 TS Sound Insulating Membrane was applied onto the bond coat. Next a layer of adhesive was applied and onto that layer was deposited a layer of ceramic tile. As set forth in Table I, the FIIC measurement for this floor sample was 47.

Test No. LR2

The tested floor/ceiling assembly which separated the source room (third floor, unit 440, living room) and receiving room (second floor, unit 340, living room) consisted of 1½" thick lightweight concrete on ⅝" plywood sheathing supported by 2"×10" wood joists 16" O.C. Attached to the underside of the wood joists was a series of resilient channels which in turn supported a layer of ⅝" gypsum board. The floor sample utilized in this test comprised a 4'×4' area of W. W. Henry Bond Coat applied to the upper surface of the lightweight concrete. Deposited onto the bond coat was a 4'×4'sample of 0.040" thick Noble CH240 TS Sound Insulating Membrane. Next, a second layer of W. W. Henry Bond Coat was applied onto the upper surface of the Noble membrane. A second 4'×4' area of 0.040" thick Noble CH240 TS Membrane was applied onto the second layer of bond coat. Lastly, a layer of adhesive was applied and ceramic tile deposited onto the upward facing surface of the adhesive layer. As illustrated in Table I, the sample exhibited an F-IIC measurement of 46.

Test No. LR4

The tested floor/ceiling assembly utilized in Test No. LR4 was the same as was utilized in Test No. LR2 . The floor sample utilized for this test was a 4'×4'area of floor to which a layer of W. W. Henry Bond Coat was applied. Next, a 4'×4'layer of Noble SRM was applied. A layer of adhesive was applied to the exposed surface of the Noble membrane and ceramic tile was then laid down. As illustrated in Table I, the F-IIC value for this floor sample covering was 49.

The Noble SRM membrane consisted of a 0.050" thick polymeric layer formed between two layers of 0.015" thick white woven polyester fabric (760 W available from Fruedenberg Fabric) partially embedded or pressed into the polymeric layer so that the total thickness of the SRM membrane was 0.072". The composition of the polymeric layer of the SRM membrane was the same as that of the polymeric layer of the CH240 TS membrane employed in tests SB2, NB2 and LR2.

TABLE I

| | (Sound levels in dB) | | | |
|---|---|---|---|---|
| Frequency (Hz) | Test No. SB2 | Test No. NB2 | Test No. LR2 | Test No. LR4 |
| 100 | 68.3 | 69.5 | 64.2 | 66.1 |
| 125 | 64.0 | 64.2 | 65.7 | 64.0 |
| 160 | 62.7 | 64.1 | 66.4 | 65.6 |
| 200 | 65.1 | 65.1 | 65.7 | 64.4 |
| 250 | 67.5 | 66.4 | 67.5 | 64.3 |
| 315 | 66.7 | 65.0 | 66.1 | 63.4 |
| 400 | 66.5 | 64.8 | 65.9 | 64.2 |
| 500 | 65.7 | 65.4 | 65.0 | 63.2 |
| 630 | 64.9 | 64.9 | 65.3 | 62.2 |
| 800 | 61.4 | 62.8 | 63.5 | 60.9 |
| 1,000 | 59.2 | 60.2 | 62.5 | 56.9 |
| 1,250 | 55.3 | 59.4 | 59.1 | 54.4 |
| 1,600 | 51.4 | 57.3 | 57.2 | 53.0 |
| 2,000 | 47.4 | 55.2 | 56.4 | 53.4 |
| 2,500 | 43.5 | 51.9 | 52.9 | 50.8 |
| 3,150 | 35.7 | 43.9 | 41.9 | 42.1 |
| 4,000 | 29.4 | 36.2 | 32.5 | 33.9 |
| 5,000 | 27.5 | 30.4 | 28.6 | 27.8 |
| F-IIC value = | 48 | 47 | 46 | 49 |

The foregoing tests SB2, NB2, LR2 and LR4 demonstrate that the membranes of the present invention, having a thickness of only 0.040" and 0.072" (thickness of CH240 TS and SRM membranes, respectively), achieved a F-IIC value of at least 45. These membranes satisfy the requirements of building codes and ordinances which require an Impact Insulation Class value of at least 45 if field tested (F-IIC), and are significantly thinner than currently available sound insulating materials.

A second set of Field Impact Isolation Tests were carried out to further determine the F-IIC values for the membranes of the present invention. These Field Impact Isolation Tests were conducted utilizing various Noble Seal Isolation systems separating a source room and a termination or receiving room at the MN Law Offices in Minneapolis, Minn. The Noble systems employed various membranes designated as TS, HP60, TM50, and PK50. The construction of the floor/ceiling assembly separating the source room and termination room consisted of 12" precast hollow core plank concrete substrate having a 3' air plenum hung below it. Also below the precast floor was a standard suspended ceiling system. Deposited onto the upper surface of the concrete floor was a 2" thick layer of structural topping. Applied onto the topping surface were various Noble Seal samples as listed in Table II below. Deposited on top of the Noble Seal samples was a layer of 6"×6"×½" quarry tiles.

The TS membrane consisted of a 0.025" thick polymeric layer formed between two layers of a 0.007" thick polyester fabric partially embedded or pressed into the polymeric layer so that the total thickness of the TS membrane was 0.030". The HP60 membrane consisted of a 0.055" thick polymeric layer formed between two layers of a 0.007" thick polyester fabric partially embedded or pressed into the polymeric layer so that the total thickness of the HP60 membrane was 0.060". The TM50 membrane consisted of a 0.045" thick polymeric layer formed between two layers of a 0.007" thick polyester fabric partially embedded or pressed into the polymeric layer so that the total thickness of the TM 50 membrane was 0.050". The PK50 membrane consisted of a 0.045" thick polymeric layer formed between two layers of a 0.006" thick polypropylene fabric partially embedded or pressed into the polymeric layer so that the total thickness of the TM 50 membrane was 0.050". The composition of the polymeric layer of each of the TS, HP60, TM50 and PK50 membranes was the same as for that of the CH240 TS membrane discussed above.

The test procedure followed for the following measurements was ASTM E1007/90, "Field Measurement of Field Tapping Machine Impact Sound Transmission Through Floor-Ceiling Assemblies and Associated Support Structures". The instrumentation was calibrated before and after tests with a sound level calibrator. The F-IIC values were obtained by applying the Ln (normalized impact sound pressure level) values to the standard contour of ASTM E989-89. The temperature and relative humidity during the test was 70° F. and 30%, respectively. The equipment used in the following tests was as follows. An Audio Spectrum Analyzer, Model PC-40, Serial No. 4587A130 and Noise Generator, Model IE-20B, Ser. No. 741C853 both manufactured by IVIE Electronics were utilized. A Bruel and Kjaer ½" Free Field Microphone, Model 4165, Serial No. 1288043, Sound Level Calibrator, Model 4230, Serial No. 282266, and Tapping Machine, Model 3204, Serial No. 84667 were utilized.

TABLE II

| | (Sound Levels in dB) | | | |
|---|---|---|---|---|
| (Hz) Frequency | Noble Seal TS | Noble Seal HP60 | Noble Seal TM50 | Noble Seal PK50 |
| 100 | 51 | 52 | 52 | 52 |
| 125 | 48 | 50 | 50 | 49 |
| 160 | 51 | 55 | 53 | 53 |
| 200 | 51 | 55 | 55 | 53 |
| 250 | 50 | 50 | 49 | 47 |
| 315 | 49 | 48 | 49 | 48 |
| 400 | 49 | 49 | 51 | 49 |
| 500 | 50 | 51 | 52 | 49 |
| 630 | 49 | 51 | 50 | 52 |
| 800 | 49 | 50 | 49 | 50 |
| 1,000 | 50 | 50 | 50 | 50 |
| 1,250 | 48 | 49 | 48 | 49 |
| 1,600 | 45 | 47 | 46 | 48 |
| 2,000 | 45 | 47 | 47 | 48 |
| 2,500 | 41 | 43 | 44 | 48 |
| 3,150 | 36 | 38 | 40 | 44 |
| F-IIC value = | 60 | 58 | 58 | 55 |

The foregoing experimental data clearly demonstrate the sound and acoustic insulating properties of the membranes of the present invention. All of the samples tested, TS, HP60, TM50 and PK50 displayed an F-IIC value greater than 45 thus all being in compliance with the minimum value of 45 adopted by most building codes and ordinances. In addition, these samples are all significantly thinner than currently available sound insulating materials.

It is understood that the foregoing are preferred embodiments of the invention and that various changes and alterations can be made without departing from the spirit and broader aspects as set forth in the appended claims, which are to be interpreted in accordance with the principals of patent law including the doctrine of equivalents.

The embodiments of the present invention in which an exclusive property or privilege is claimed are as follows:

1. A method of forming a sound insulating floor, ceiling or wall construction comprising the steps of:

providing a substrate; and applying a sound insulating membrane to said substrate, said membrane comprising at least one backing layer, and a polymeric layer contacting said one backing layer, said polymeric layer formed from at least one polymeric material, said polymeric layer having an elongation factor of from about 500% to about 900% and a Shore A hardness of from about 65 to about 80 points, 5 seconds, said membrane having a thickness of less than about 0.150" wherein said insulating membrane achieves an Impact Insulation Class rating of at least about 45, as determined by ASTM E90, E336, and E492.

2. The method of claim 1 wherein said polymeric layer comprises from about 40% to about 70% chlorinated polyethylene, from about 20% to about 30% ethylene vinyl acetate, and up to about 10% polyvinyl chloride.

3. The method of claim 1 wherein said substrate is formed from a material selected from the group consisting of wood, concrete, cement, masonry materials other than concrete or cement, metal and composites thereof.

4. The method of claim 1 further comprising depositing a layer of adhesive between said substrate and said sound insulating membrane.

5. The method of claim 1 wherein said backing layer is formed from a material selected from the group consisting of polyester, polypropylene, polyamide, and glass.

6. The method of claim 5 wherein said backing layer has a thickness of about 0.004" to about 0.020".

7. The method of claim 1 wherein said polymeric layer has a thickness of from about 0.020" to about 0.066".

8. The method of claim 1 wherein said method further comprises applying a floor covering to at least one of said substrate and said membrane.

9. The method of claim 1 wherein said polymeric layer has an elongation factor of from about 600% to about 800%.

10. The method of claim 1 wherein said polymeric layer has a Shore A hardness of less than about 75 points, 5 seconds.

11. The method of claim 1 wherein said backing layer is embedded into said polymeric layer to a depth of about one-half of the thickness of said backing layer.

12. The method of claim 11 wherein said membrane has a total thickness of about 0.04 inches or less.

\* \* \* \* \*

UNITED STATES PATENT AND TRADEMARK OFFICE
CERTIFICATE OF CORRECTION

PATENT NO. : 5,584,950
DATED : December 17, 1996
INVENTOR(S) : Walter J. Gaffigan It is certified that error appears in the above-identified patent and that said Letters Patent is hereby corrected as shown below:

Column 1, Line 8;

"File" should be --The--.

Column 2, Line 67;

After "40%" insert --to--.

Column 7, Line 45;

"C." should be --O.C.--.

Column 7, Line 49;

"C." should be --O.C.--.

UNITED STATES PATENT AND TRADEMARK OFFICE
CERTIFICATE OF CORRECTION

PATENT NO.   :   5,584,950
DATED        :   December 17, 1996
INVENTOR(S)  :   Walter J. Gaffigan It is certified that error appears in the above-identified patent and that said Letters Patent is hereby corrected as shown below:

Column 7, Line 54;

"4' x 4"" should be --4' x 4'--.

Column 7, Line 57;

"4" x 4"" should be --4' x 4'--.

Column 10, Line 2;

"TM50" should be --PK50--.

Signed and Sealed this

Twenty-fourth Day of June, 1997

Attest:

BRUCE LEHMAN

Attesting Officer

Commissioner of Patents and Trademarks